US009623636B2

(12) United States Patent
Joza et al.

(10) Patent No.: US 9,623,636 B2
(45) Date of Patent: Apr. 18, 2017

(54) LAMINATED BODY OF RUBBER LAYERS

(75) Inventors: Ayako Joza, Hiratsuka (JP); Takahiro Okamatsu, Hiratsuka (JP)

(73) Assignee: The Tokohama Rubber Co., Ltd., Tokyo (JP)

( * ) Notice: Subject to any disclaimer, the term of this patent is extended or adjusted under 35 U.S.C. 154(b) by 226 days.

(21) Appl. No.: 14/233,452

(22) PCT Filed: Jul. 20, 2012

(86) PCT No.: PCT/JP2012/068446
§ 371 (c)(1),
(2), (4) Date: Jan. 17, 2014

(87) PCT Pub. No.: WO2013/012062
PCT Pub. Date: Jan. 24, 2013

(65) Prior Publication Data
US 2014/0150946 A1    Jun. 5, 2014

(30) Foreign Application Priority Data
Jul. 20, 2011  (JP) .................................. 2011-159419

(51) Int. Cl.
*B60C 1/00*   (2006.01)
*B60C 5/14*   (2006.01)
(Continued)

(52) U.S. Cl.
CPC .......... *B32B 25/08* (2013.01); *B29D 30/0061* (2013.01); *B32B 7/12* (2013.01); *B32B 25/16* (2013.01); *B32B 27/34* (2013.01); *B32B 27/36* (2013.01); *B60C 1/00* (2013.01);
(Continued)

(58) Field of Classification Search
CPC .. B60C 5/14; B60C 2005/14; B60C 2005/145
See application file for complete search history.

(56) References Cited

U.S. PATENT DOCUMENTS 4,588,637 A * 5/1986 Chiu .......................... C09J 7/00
428/355 BL
7,589,155 B2 * 9/2009 Ashiura .................... C08F 8/30
525/260

(Continued)

FOREIGN PATENT DOCUMENTS

JP         60-30331      *  2/1985
JP         2006-044503 A    2/2006
(Continued)

*Primary Examiner* — Justin Fischer
(74) *Attorney, Agent, or Firm* — Carrier Blackman & Associates, P.C.; Joseph P. Carrier; Anne G. Sabourin

(57) ABSTRACT

A laminated body of rubber layers includes: a resin layer formed from a polyester resin or a polyamide resin; a rubber layer formed from a rubber composition containing a diene rubber; and an adhesive layer disposed between the resin layer and the rubber layer. The adhesive rubber composition contains a modified rubber composition (A) or a modified rubber composition (B) both having a number average molecular weight of 70,000 to 110,000. The modified rubber composition (A) is formed from a modified butyl rubber (1) formed by reacting, with a butyl rubber, a compound having in a molecule a nitroxide free radical that is stable at ambient temperature in the presence of oxygen, a radical initiator, and a co-crosslinking agent. The modified rubber composition (B) is formed by compounding the co-crosslinking agent with a modified butyl rubber (2) formed by reacting the compound and the radical initiator with the butyl rubber.

4 Claims, 2 Drawing Sheets

(51) Int. Cl.
  *B32B 25/08* (2006.01)
  *B60C 19/00* (2006.01)
  *C08K 3/00* (2006.01)
  *B29D 30/00* (2006.01)
  *B60C 23/04* (2006.01)
  *B32B 7/12* (2006.01)
  *B32B 25/16* (2006.01)
  *B32B 27/34* (2006.01)
  *B32B 27/36* (2006.01)
  *C08K 5/3432* (2006.01)

(52) U.S. Cl.
  CPC .......... *B60C 1/0008* (2013.04); *B60C 19/00* (2013.01); *B60C 23/0493* (2013.01); *C08K 3/0016* (2013.01); *B29D 2030/0072* (2013.01); *B60C 5/14* (2013.01); *B60C 2005/145* (2013.04); *C08K 5/3432* (2013.01); *Y10T 152/10495* (2015.01); *Y10T 428/31757* (2015.04); *Y10T 428/31797* (2015.04)

(56) References Cited

U.S. PATENT DOCUMENTS

| | | | |
|---|---|---|---|
| 7,700,695 B2 | 4/2010 | Ashiura et al. | |
| 8,580,877 B2* | 11/2013 | Tsou | B32B 7/12 |
| | | | 152/450 |
| 2004/0135129 A1* | 7/2004 | Hattori | C08L 23/16 |
| | | | 252/510 |
| 2011/0024015 A1* | 2/2011 | Takahashi | B60C 1/0008 |
| | | | 152/510 |
| 2011/0198011 A1* | 8/2011 | Matsuda | B60C 5/14 |
| | | | 152/543 |
| 2013/0014880 A1 | 1/2013 | Tsou et al. | |

FOREIGN PATENT DOCUMENTS

| | | |
|---|---|---|
| JP | 2009-084475 A | 4/2009 |
| JP | 2009-528925 A | 8/2009 |

* cited by examiner

US 9,623,636 B2

LAMINATED BODY OF RUBBER LAYERS

TECHNICAL FIELD

The present invention relates to a laminated body of rubber layers, and relates to a laminated body of rubber layers by which adhesion between a resin layer and a rubber layer is enhanced to or beyond conventional levels.

BACKGROUND

It is known that air pressure sensors, noise absorbing members, tire tags (radio frequency identification tags), chips, or other accessories are fixed on inner surfaces of pneumatic tires. In order to facilitate the fixing of these accessories, fixing a surface fastener on a tire inner surface and on an accessory and then adhering these surface fasteners to each other has been proposed (e.g. see Patent Document 1).

However, surface fasteners are generally formed from polyester resins or polyamide resins, and it has been difficult to firmly adhere the surface fasteners to the inner surfaces of tires made of rubber compositions. If adhesion between a resin layer of the surface fastener or the like and a rubber layer forming the tire inner surface is insufficient, failures such as an air pressure sensor, or the like accessory, falling off occur. As a method for adhering a resin layer (e.g. surface fasteners or the like) to a tire inner surface, a method is known in which a layer of a rubber composition for vulcanization adhesion is disposed between the resin layer and the tire inner surface, and then vulcanization-adhered via heat applied during tire vulcanization. However, with the conventional vulcanization adhesion method, adhesion between the tire inner surface and the resin layer is not always sufficient, and there has been a demand for enhancing the adhesive strength to or beyond conventional levels.

PRIOR ART DOCUMENTS

Patent Documents

Patent Document 1: Japanese Unexamined Patent Application Publication No. 2006-044503A

SUMMARY OF THE INVENTION

Problems to be Solved by the Invention

An object of the present invention is to provide a laminated body of rubber layers by which adhesion between a resin layer and a rubber layer is enhanced to or beyond conventional levels.

Means to Solve the Problem

To achieve the above object, the laminated body of rubber layers of the present invention comprises: a resin layer formed from a polyester resin or a polyamide resin; a rubber layer formed from a rubber composition containing a diene rubber; and an adhesive layer formed from an adhesive rubber composition and being disposed between the resin layer and the rubber layer. The adhesive rubber composition contains a modified rubber composition (A) or a modified rubber composition (B) both having a number average molecular weight of 70,000 to 110,000. The modified rubber composition (A) is formed from a modified butyl rubber (1) formed by reacting, with a butyl rubber, a compound (a) having in a molecule a nitroxide free radical that is stable at ambient temperature in the presence of oxygen, a radical initiator (b), and a co-crosslinking agent (c). The modified rubber composition (B) is formed by compounding the co-crosslinking agent (c) with a modified butyl rubber (2) formed by reacting the compound (a) and the radical initiator (b) with the butyl rubber.

Effects of the Invention

In the laminated body of rubber layers of the present invention, the adhesive rubber composition constitutes the adhesive layer disposed between the resin layer formed from a polyester resin or a polyamide resin, and the rubber layer formed from a rubber composition containing a diene rubber. This adhesive rubber composition comprises the modified rubber composition (A) formed from the modified butyl rubber (1) formed by reacting, with a butyl rubber, a compound (a) having in a molecule a nitroxide free radical that is stable at ambient temperature in the presence of oxygen, a radical initiator (b), and a co-crosslinking agent (c), and the modified rubber composition (B) formed by compounding the co-crosslinking agent (c) with the modified butyl rubber (2) formed by reacting the compound (a) and the radical initiator (b) with the butyl rubber; and both the modified rubber compositions (A) and (B) have a number average molecular weight of 70,000 to 110,000. Therefore, the laminated body of rubber layers of the present invention firmly vulcanization-adheres the resin layer and the rubber layer, and the adhesion between the both layers can be enhanced to or beyond conventional levels. In particular, since the number average molecular weight of the modified rubber compositions (A) and (B) is set to be from 70,000 to 110,000, the adhesive strength of the resin layer and the rubber layer can be ensured for an extended period of time.

The modified rubber compositions (A) and (B) preferably comprise a resin crosslinking agent or an organic peroxide, so that the vulcanization adhesion of the resin layer and the rubber layer can be further enhanced. Furthermore, the organic peroxide preferably has a temperature at which the half life thereof becomes one minute of 120 to 170° C., and preferably, from 0.1 to 10 parts by weight of the organic peroxide is contained per 100 parts by weight of the rubber composition of the adhesive rubber composition.

The modified rubber compositions (A) and (B) preferably have a Mooney viscosity ($ML_{1+4}/100°$ C.) in accordance with JIS K6300 of 30 to 55. By setting the Mooney viscosity of the modified rubber composition to be in such a range, it is possible to improve the wettability to the resin layer and the rubber layer, and enhance the adhesion between the both layers for an extended period of time while ensuring an excellent processability.

The laminated body of rubber layers of the present invention can suitably constitute a part of a pneumatic tire. The pneumatic tire using the laminated body of rubber layers can securely hold an accessory having a resin layer or an accessory mounted using a resin layer interposed therebetween.

DETAILED DESCRIPTION

Figure 1:
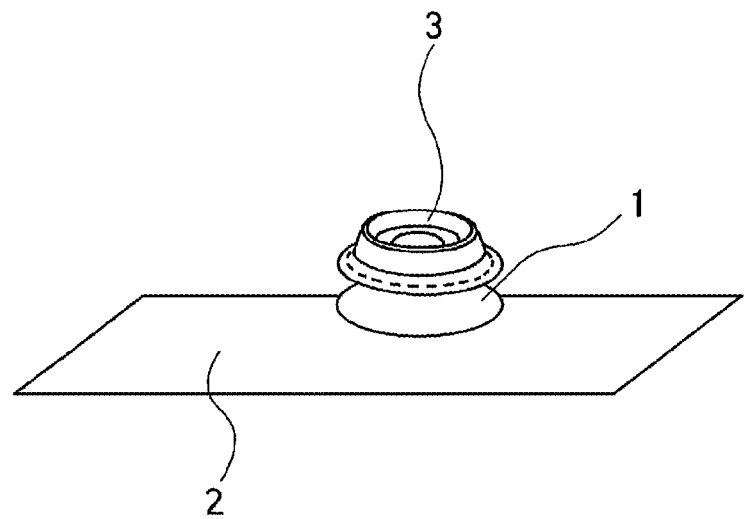
FIG. 1 is a schematic view schematically illustrating a configuration of an embodiment of a laminated body of rubber layers of the present invention.

Detailed descriptions will be given below of a configuration of the present invention with reference to the accompanying drawings. FIG. 1 is a schematic view schematically illustrating a configuration of an embodiment of a laminated body of rubber layers of the present invention.

FIG. 1 illustrates each component schematically by showing some space between the positions of the components. In FIG. 1, 1 is an adhesive layer, 2 is a rubber layer, and 3 is a resin layer. In the example of FIG. 1, the resin layer 3 is configured to be a part of a snap fastener, and adhered to the rubber layer 2 via the adhesive layer 1. It is sufficient that the area of the rubber layer 2 be an area at least greater than or equal to the projected area of the resin layer 3.

In the present invention, the resin layer 3 is a layer formed from a polyester resin or a polyamide resin, and the form of the resin layer 3 may be a layer by itself, or may be a part of a molded product formed from a polyester resin or a polyamide resin. The molded product having the resin layer is not particularly limited, and can be a noise absorbing member, air pressure sensor, tire tag, or a base part, container, or fixing member thereof. The form of the fixing member is not particularly limited as long as the fixing member is formed from a polyester resin or a polyamide resin. Examples of the form include surface fasteners, snap fasteners, ring snaps, ring hooks, American snaps, American hooks, eyelet hooks, spring hooks, jumper hooks, and the like.

The rubber layer 2 is a layer formed from a rubber composition containing a diene rubber. Examples of the rubber layer 2 include surfaces of rubber industrial products, inner surfaces of pneumatic tires, and the like. The rubber layer 2 is preferably an inner surface of a pneumatic tire, and particularly preferably an inner liner layer of a pneumatic tire.

The rubber composition constituting the rubber layer 2 contains a diene rubber as a rubber component. Examples of the diene rubber include butyl rubbers, natural rubbers, isoprene rubbers, butadiene rubbers, styrene butadiene rubbers, acrylonitrile butadiene rubbers, and the like. Of these, butyl rubbers, natural rubbers, butadiene rubbers, and styrene butadiene rubbers are preferable, and butyl rubbers are particularly preferable. The rubber composition can be a typical composition constituting pneumatic tires or various types of rubber industrial products.

In the present invention, the adhesive layer 1 is disposed between the rubber layer 2 and the resin layer 3, and firmly adheres the rubber layer 2 and the resin layer 3. The adhesive layer 1 forms a rubber molding body (unvulcanized rubber sheet) formed from an adhesive rubber composition containing a modified rubber composition (A) or (B). The rubber molding body is disposed between the rubber layer 2 and the resin layer 3, and then vulcanized, thereby forming the laminated body of rubber layers.

The adhesive rubber composition constituting the adhesive layer 1 is formed from the modified rubber composition (A) or (B), and contains at least one selected from sulfur, resin crosslinking agents, and organic peroxides. Preferably, the adhesive rubber composition contains a resin crosslinking agent or an organic peroxide. Since both the modified rubber compositions (A) and (B) crosslink/vulcanize when heated in the presence of sulfur, a resin crosslinking agent, and/or an organic peroxide, the modified rubber compositions (A) and (B) crosslink during the vulcanization of the unvulcanized rubber layer and, at the same time, crosslink/vulcanization-adhere the resin layer and the rubber layer. Therefore, both of the layers can be adhered with the adhesive strength enhanced to or beyond conventional levels.

In the present invention, examples of the resin crosslinking agent include alkylphenol-formaldehyde resin, melamine-formaldehyde condensation product, and triazine-formaldehyde condensation product. These resin curing agents can be used alone, or a plurality of types can be used in a combination.

The alkylphenol-formaldehyde resin is a resin obtained by condensation reacting an alkylphenol and formaldehyde using an inorganic acid such as a hydrochloric acid or oxalic acid, an organic acid, or a catalyst such as a zinc acetate, and then distilling off excess unreacted alkylphenol. Examples of the alkylphenol include an ortho-, meta-, or para-cresol, a 2,3-, 2,4-, 2,5-, 2,6-, 3,4-, or 3,5-xylenol, a p-tert-butylphenol, and the like. Examples of the alkylphenol-formaldehyde resin include TACKIROL 250-1 and TACKIROL 201 both manufactured by Taoka Chemical Co., Ltd., and the like.

The melamine-formaldehyde condensation product is a so-called melamine resin, obtained by reacting a melamine and a formaldehyde in an addition polymerization reaction (methylolization, methylenation), and then reacting the obtained product by heating while adding an alkaline catalyst in the reaction vessel. Examples of the melamine-formaldehyde condensation product include Crez 711 latex curing resin manufactured by American Cyanamid Company and the like.

The triazine-formaldehyde condensation product is a condensation product obtained by reacting a triazine and a formaldehyde under an alkaline reaction condition. Examples of the triazine-formaldehyde condensation product include Crez 915 latex curing resin manufactured by American Cyanamid Company and the like.

Examples of the organic peroxide include benzoyl peroxide; t-butyl peroxy benzoate; dicumylperoxide; t-butyl cumyl peroxide; di-t-butylperoxide; 2,5-dimethyl-2,5-di-t-butyl peroxy hexane; 2,5-dimethyl-2,5-di-t-butyl peroxy-3-hexyne; 2,4-dichloro-benzoyl peroxide; di-t-butylperoxy-di-isopropylbenzene; 1,1-bis(t-butylperoxy)-3,3,5-trimethyl-cyclohexane; n-butyl-4,4-bis(t-butylperoxy)valerate; 2,2-bis (t-butylperoxy)butane; and the like.

In the present invention, the organic peroxide preferably has the temperature at which the half life thereof becomes one minute of 120 to 170° C., and more preferably 135 to 160° C. By setting the temperature at which the half life of the organic peroxide becomes one minute to be 120 to 170° C., crosslinking of the adhesive rubber composition sufficiently proceeds at the temperature for vulcanization molding unvulcanized rubbers, particularly green tires. The "temperature at which the half life thereof becomes one minute" is a temperature at which the half life of the organic peroxide becomes one minute, and if the temperature at which the half life of the organic peroxide becomes one minute is less than 120° C., scorching tends to occur during the vulcanization molding. Also, if the temperature at which the half life thereof becomes one minute exceeds 170° C., crosslinking efficiency decreases because the crosslinking does not proceeds sufficiently during the vulcanization molding.

Examples of the organic peroxide having the temperature at which the half life thereof becomes one minute of 120 to 170° C. include Perkadox 12 (145° C.), Trigonox 121 (125° C.), Kayaester O (133° C.), Kayaester AN (155° C.), and the like.

A compounded amount of the resin crosslinking agent and the organic peroxide is preferably from 0.1 to 10 parts by weight, and more preferably from 0.5 to 8 parts by weight, per 100 parts by weight of the rubber component of the adhesive rubber composition. If the compounded amount of the resin crosslinking agent and the organic peroxide is less than 0.1, the crosslinking may not proceed sufficiently during the vulcanization molding. Also, if the compounded amount of the resin crosslinking agent and the organic peroxide exceeds 10 parts by weight, the physical properties of the crosslinked product and/or processability may be deteriorated.

In the present invention, the modified rubber compositions (A) and (B) both have the number average molecular weight of preferably from 70,000 to 110,000, and more preferably from 80,000 to 110,000. By setting the number average molecular weight of the modified rubber composition to be in such a range, molecular mobility of the rubber molecule during the vulcanization increases, and thus the adhesion between the rubber layer and the resin layer is further enhanced. Therefore, the long-term adhesion can be enhanced. If the number average molecular weight of the modified rubber composition is less than 70,000, the peel strength may be lowered. On the other hand, a number average molecular weight of the modified rubber composition exceeding 110,000 results in poor rubber sticking. That is, when the adhered rubber layer and resin layer are peeled off, in the failure pattern the proportion of the adhered surface that experiences the material failure of the adhesive layer (rubber sticking) is lowered, and interfacial failure tends to occur. Therefore, the long-term adhesion may be reduced. Note that, the number average molecular weight of the modified rubber composition (B) is a number average molecular weight of the modified rubber reacted by heating after compounding a co-crosslinking agent (c) into a corresponding modified butyl rubber (2). The number average molecular weight of the modified rubber composition is measured by gel permeation chromatography (GPC), in terms of standard polystyrene.

In the present invention, the modified rubber compositions (A) and (B) both have the Mooney viscosity (ML1+4/100° C.) of preferably from 30 to 55, and more preferably from 32 to 52. By setting the Mooney viscosity of the modified rubber composition to be in such a range, it is possible to improve the wettability of the rubber layer and the resin layer, and enhance the adhesion between the rubber layer and the resin layer for an extended period of time while ensuring an excellent processability. If the Mooney viscosity of the modified rubber composition is less than 30, the processability may deteriorate. Also, if the Mooney viscosity of the modified rubber composition exceeds 55, the wettability to the rubber layer and the resin layer is decreased, and the rubber sticking is decreased. Therefore, when the adhered rubber layer and resin layer are peeled off, in the failure pattern the proportion of the adhered surface that experiences the material failure of the adhesive layer is lowered, and the long-term adhesion may be reduced. Note that, the Mooney viscosity of the modified rubber composition (B) is a Mooney viscosity of the modified rubber reacted by heating after compounding a co-crosslinking agent (c) into a corresponding modified butyl rubber (2). In accordance with BS K6300, the Mooney viscosity (ML1+4/100° C.) of the modified rubber composition is measured at 100° C.

The modified rubber composition (A) is formed from a modified butyl rubber (1) that is formed by reacting a compound (a) having in a molecule a nitroxide free radical that is stable at ambient temperature in the presence of oxygen (hereinafter referred to as "compound (a)"), a radical initiator (b), and a co-crosslinking agent (c) with butyl rubber. While the manufacturing method of the modified butyl rubber (1) is not particularly limited, methods such as the following are preferable. First, a modified butyl rubber (2), in which the compound (a) is grafted to butyl rubber, is prepared by reacting the compound (a) and the radical initiator (b) with butyl rubber. Then, a peroxide crosslinkable modified butyl rubber (1) is prepared by reacting the co-crosslinking agent (c) with the modified butyl rubber (2).

The modified rubber composition (B) is formed from a composition formed by compounding the co-crosslinking agent (c) with a modified butyl rubber (2) formed by reacting the compound (a) and the radical initiator (b) with the butyl rubber. By heating this modified rubber composition (B), a reaction between the modified butyl rubber (2) and the co-crosslinking agent (c) and a peroxide crosslinking proceed simultaneously.

Examples of the compound (a) having in a molecule a nitroxide free radical that is stable at ambient temperature in the presence of oxygen used in the present invention include 2,2,6,6-tetramethyl-1-piperidinyloxy (hereinafter referred to as "TEMPO") described by the following formula (1); 4-oxo-2,2,6,6-tetramethyl-1-piperidinyloxy described by the following formula (2); and the like. Furthermore, a compound having a substituent at the position 4 of the TEMPO represented by the following formulas (3) to (8) can also be used as the compound (a).

Formula 1

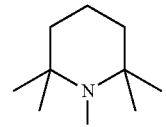

(1)

Formula 2

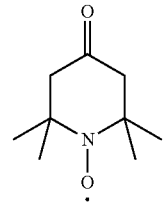

(2)

Formula 3

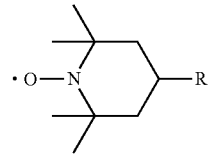

(3)

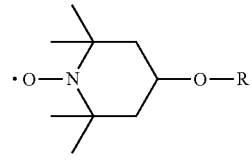

(4)

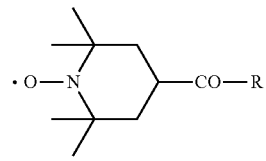

(5)

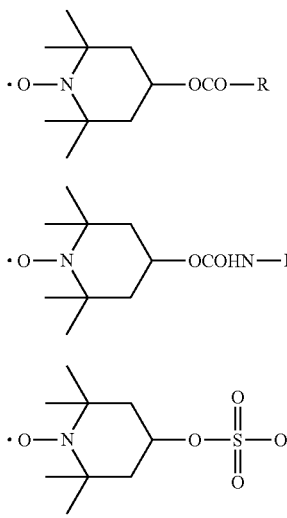

(6)

(7)

(8)

In the above formulas (3) to (8), R is a group having from 1 to 30 carbons selected from an alkyl group, an alkylene group, an aryl group, an allyl group, a vinyl group, a carboxyl group, a carbonyl group-containing group, an ester group, an epoxy group, an isocyanate group, a hydroxy group, a thiol group, a thiirane group, an amino group, an amide group, an imide group, a nitro group, a nitrile group, a thiocyan group, a silyl group, an alkoxysilyl group, or an organic group containing these functional groups.

Herein, examples of a carbonyl group-containing group include residues of cyclic acid anhydrides such as succinic anhydride, maleic anhydride, glutaric anhydride, phthalic anhydride, and the like. Furthermore, in the formula (3), R may also be a halogen such as chlorine, bromine, or the like.

Examples of the compound (a) represented by the formula (3) include 4-methyl TEMPO, 4-ethyl TEMPO, 4-phenyl TEMPO, 4-chloro TEMPO, 4-hydroxy TEMPO, 4-amino TEMPO, 4-carboxyl TEMPO, 4-isocyanate TEMPO, and the like. Examples of the compound (a) represented by the formula (4) include 4-methoxy TEMPO, 4-ethoxy TEMPO, 4-phenoxy TEMPO, 4-TEMPO-glycidyl ether, 4-TEMPO-thioglycidyl ether, and the like.

Examples of the compound (a) represented by the formula (5) include 4-methylcarbonyl TEMPO, 4-ethylcarbonyl TEMPO, 4-benzoyl TEMPO, and the like. Examples of the compound (a) represented by the formula (6) include 4-acetoxy TEMPO, 4-ethoxycarbonyl TEMPO, 4-methacrylate TEMPO, 4-benzoyloxy TEMPO, and the like.

Examples of the compound (a) represented by the formula (7) include 4-(N-methylcarbamoyloxy) TEMPO, 4-(N-ethylcarbamoyloxy) TEMPO, 4-(N-phenylcarbamoyloxy) TEMPO, and the like. Examples of the compound (a) represented by the formula (8) include methyl (4-TEMPO) sulfate, ethyl (4-TEMPO) sulfate, phenyl (4-TEMPO) sulfate, and the like.

Furthermore, examples of the compound (a) include compounds of 2,2,5,5-tetramethyl-1-pyrrolidinyloxy (hereinafter referred to as "PROXYL") with a substituent at the position 3 as represented by the following formula (9); and compounds of 2,2,5,5-tetramethyl-3-pyrrolin-1-oxy (hereinafter referred to as "PRYXYL") with a substituent at the position 3 as represented by the following formula (10).

Formula 4

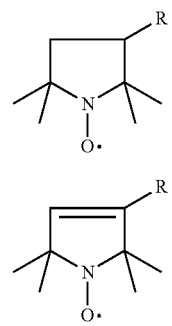

(9)

(10)

In the above formulas (9) and (10), R is a group having from 1 to 30 carbons selected from an alkyl group, an aryl group, an allyl group, a vinyl group, an alkoxy group, a carboxyl group, a carbonyl group-containing group, an ester group, an epoxy group, a glycidyl group, an isocyanate group, a hydroxy group, a thiol group, a thiirane group, a thioglycidyl group, an amino group, an amide group, an imide group, a carbamoyl group, a nitro group, a nitrile group, a thiocyan group, a silyl group, an alkoxysilyl group, or an organic group containing these functional groups.

Examples of the compound (a) represented by the formula (9) include 3-amino-PROXYL, 3-hydroxy-PROXYL, 3-isocyanate-PROXYL, 3-carboxyl-PROXYL, 3-PROXYL-glycidyl ether, 3-PROXYL-thioglycidyl ether, 3-carbamoyl-PROXYL, and the like. Examples of the compound (a) represented by the formula (10) include 3-amino-PRYXYL, 3-hydroxy-PRYXYL, 3-isocyanate-PRYXYL, 3-carboxyl-PRYXYL, 3-PRYXYL-glycidyl ether, 3-PRYXYL-thioglycidyl ether, 3-carbamoyl-PRYXYL, and the like. Other examples of the compound (a) include the following:

Formula 5

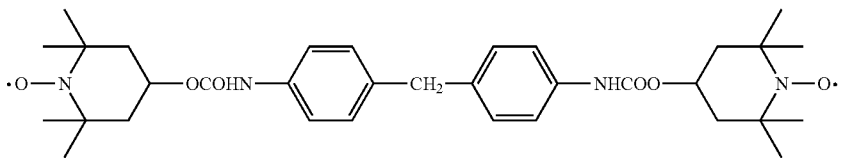

MDP-TEMPO

-continued
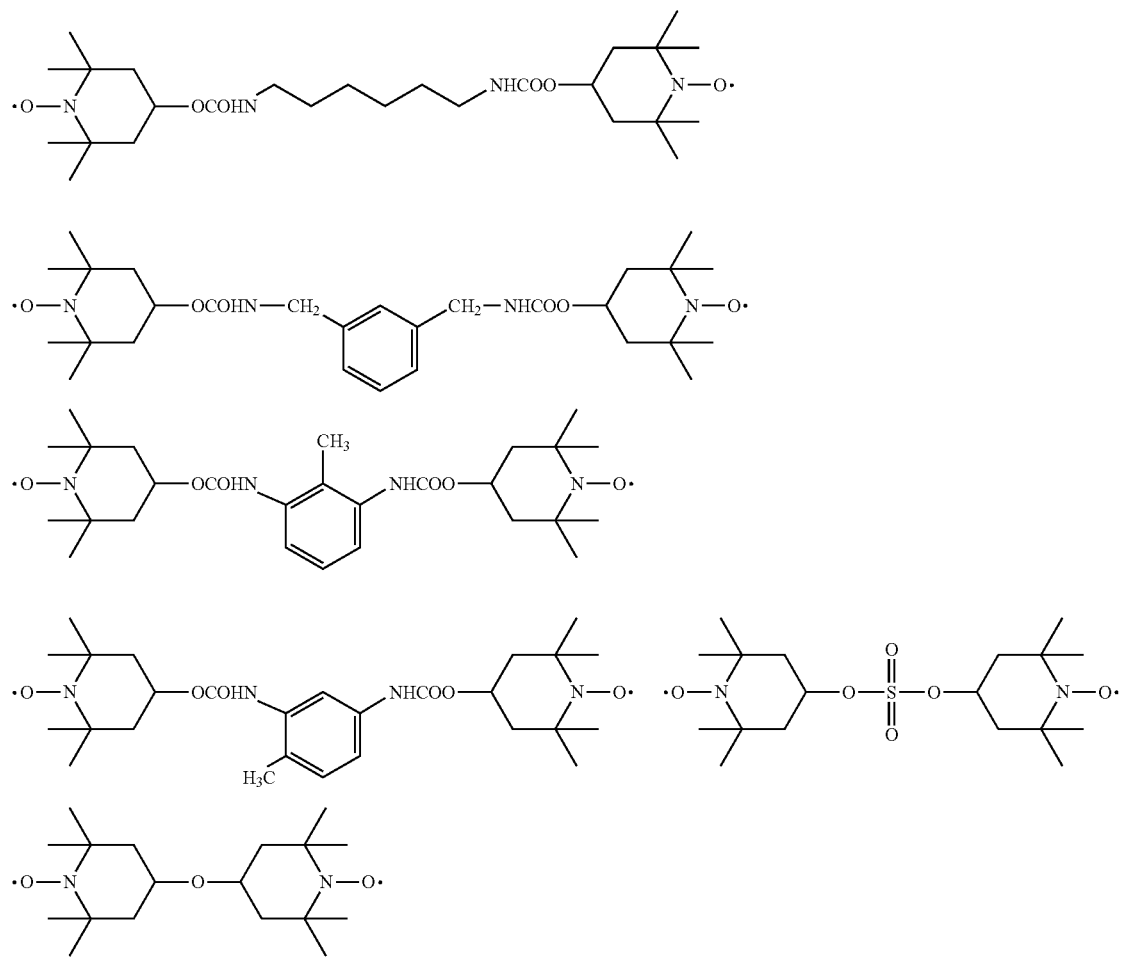
Formula 6
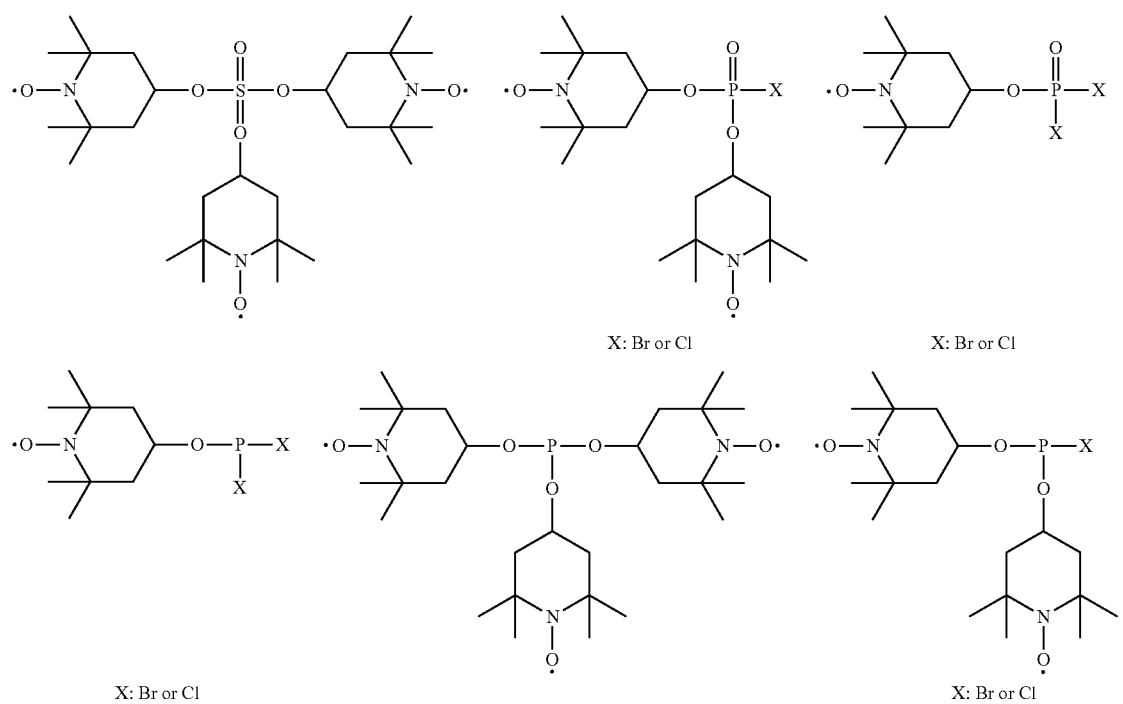
X: Br or Cl
X: Br or Cl
X: Br or Cl
X: Br or Cl Formula 7

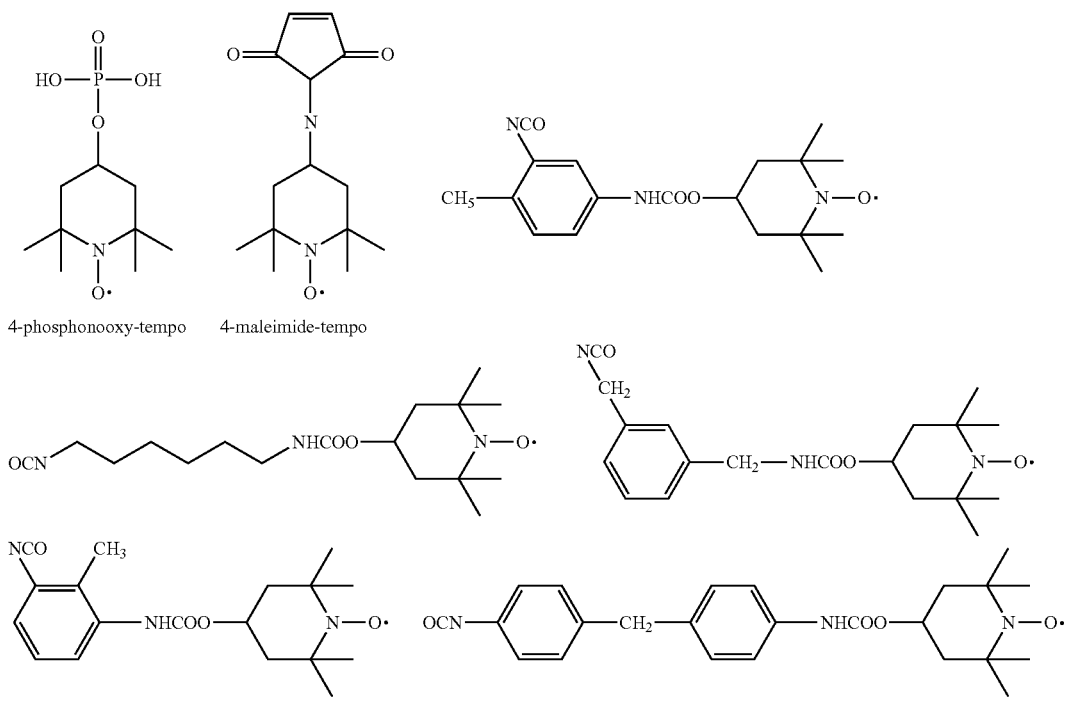

4-phosphonooxy-tempo   4-maleimide-tempo

Formula 8

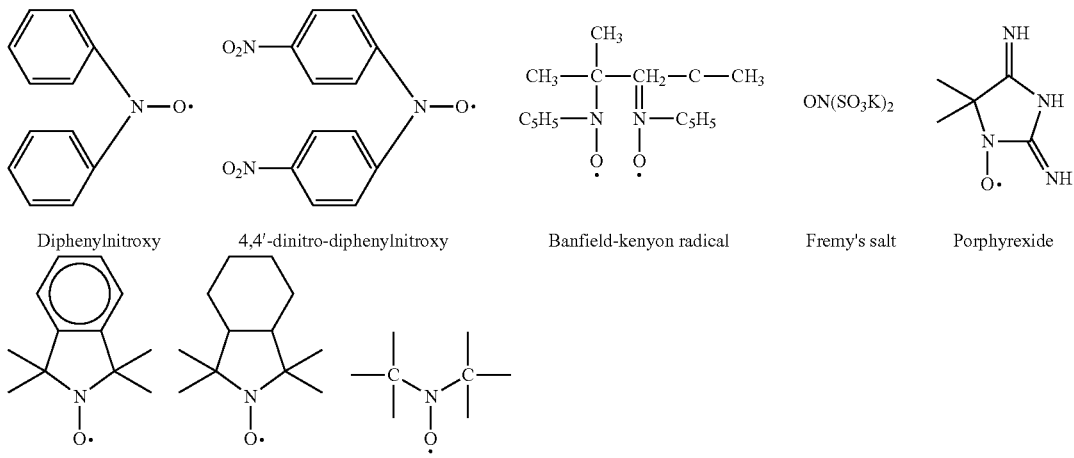

Diphenylnitroxy   4,4'-dinitro-diphenylnitroxy   Banfield-kenyon radical   Fremy's salt   Porphyrexide An added amount of the compound (a) used in the present invention is not particularly limited, but is preferably from 0.001 to 0.5 mol, and more preferably from 0.005 to 0.1 mol, per 100 g of the butyl rubber. If the added amount of the compound (a) is too small, there is a possibility that a degree of modification to the butyl rubber will be too small. Conversely, if the added amount is too large, there is a possibility that the peroxide crosslinking will not proceed.

With the present invention, the compound (a) can be introduced to the molecular chain of the butyl rubber by adding the radical initiator (b). Any desired radical initiator can be used as the radical initiator (b), and specific examples include benzoyl peroxide, t-butyl peroxy benzoate, dicumylperoxide, t-butyl cumyl peroxide, di-t-butylperoxide, 2,5-dimethyl-2,5-di-t-butyl peroxy hexane, 2,5-dimethyl-2,5-di-t-butyl peroxy-3-hexyne, 2,4-dichloro-benzoyl peroxide, di-t-butylperoxy-di-isopropylbenzene, 1,1-bis(t-butylperoxy)-3,3,5-trimethyl-cyclohexane, n-butyl-4,4-bis(t-butylperoxy)valerate, 2,2-bis(t-butylperoxy)butane, diisobutylperoxide, cumyl peroxy neodecanoate, di-n-propyl peroxy dicarbonate, diisopropyl peroxy dicarbonate, di-sec-butylperoxy dicarbonate, 1,1,3,3-tetramethyl butyl peroxy neodecanoate, di(4-t-butylcyclohexyl)peroxy dicarbonate, 1-cyclohexyl-1-methylethyl peroxy neodecanoate, di(2-ethoxyethyl)peroxy dicarbonate, di(2-ethoxyhexyl)peroxy dicarbonate, t-hexylperoxy neodecanoate, dimethoxybutyl peroxy dicarbonate, t-butyl peroxy neodecanoate, t-hexyl peroxy pivalate, t-butyl peroxy pivalate, di(3,5,5-trimethyl-hexanoyl)peroxide, di-n-octanoyl peroxide, dilauroyl peroxide, distearoyl peroxide, 1,1,3,3-tetramethyl butylperoxy-2-ethylhexanoate, disuccinate peroxide, 2,5-dimethyl-2,5-di(2-ethylhexanoyl peroxy)hexane, t-hexyl peroxy-2-ethylhexanoate, di(4-methylbenzoyl)peroxide, t-butylperoxy-2-ethylhexanoate; mixtures of di(3-methylbenzoyl)peroxide, benzoyl(3-methylbenzoyl)peroxide, and dibenzoyl peroxide; dibenzoyl peroxide, t-butyl peroxy isobutyrate, and the like.

Additionally, a radical initiator capable of decomposing at low temperature due to an action of a redox catalyst can also be used. Typical examples of such a radical initiator include dibenzoyl peroxide; p-menthane hydroperoxide; diisopropylbenzene hydroperoxide; 1,1,3,3-tetramethylbutyl hydroperoxide; cumene hydroperoxide; t-butyl hydroperoxide; and the like.

Other examples of the radical initiator include azo-based radical initiators such as azodicarbonamide; azobisisobutyronitrile; 2,2'-azobis-(2-amidinopropane)dihydrochloride; dimethyl 2,2'-azobis(isobutyrate); azobis-cyanovaleric acid; 1,1'-azobis-(2,4-dimethylvaleronitrile); azobismethylbutyronitrile; 2,2'-azobis-(4-methoxy-2,4-dimethylvaleronitrile); and the like.

By adding the radical initiator (b) to a reaction system (blended system or catalyst system), carbon radicals can be generated in the butyl rubber, and the modified butyl rubber can be obtained by reacting the compound (a) having stable free radicals with these carbon radicals. Note that, the radical initiator (x) and the radical initiator (b) are each independent, and the types of the compounds may be the same or different.

An added amount of the radical initiator (b) used in the present invention is not particularly limited, but is preferably from 0.001 to 0.5 mol, and more preferably from 0.005 to 0.2 mol, per 100 g of the butyl rubber. If the added amount of the radical initiator (b) is too low, there is a possibility that the number of hydrogen atoms pulled from the butyl rubber chain will be low. Conversely, if the added amount is too high, there is a possibility that the main chain of the butyl rubber will decompose, greatly reducing the molecular weight thereof.

In the present invention, adding the co-crosslinking agent (c) causes the above-described reaction with the modified butyl rubber, and a crosslinking reaction occurs during peroxide crosslinking. Although the co-crosslinking agent (c) is not particularly limited, a radical polymeric monomer having at least difunctionality and/or a radical polymeric monomer having an alkoxysilyl group can be used as the co-crosslinking agent (c). In particular, by constituting the modified rubber composition (A) or (B) by simultaneously reacting or compounding the radical polymeric monomer having at least difunctionality and the radical polymeric monomer having an alkoxysilyl group, the modulus and the breaking strength of the obtained vulcanization adhesive layer can be increased, thereby enhancing durability.

Examples of the radical polymeric monomer having at least difunctionality include ethylene di(meth)acrylate (hereinafter the term "ethylene di(meth)acrylate" refers to both ethylene dimethacrylate and ethylene diacrylate); trimethylolpropane tri(meth)acrylate; ethylene glycol di(meth)acrylate; polyethylene glycol di(meth)acrylate; 1,6-hexanediol di(meth)acrylate; tetramethylolmethane tri(meth)acrylate; tetramethylolmethane tetra(meth)acrylate; tris(2-hydroxyethyl)isocyanurate tri(meth)acrylate; ethoxylated trimethylolpropane tri(meth)acrylate; pentaerythritol tri(meth)acrylate; ethoxylated trimethylolpropane tri(meth)acrylate; propoxylated trimethylolpropane(meth)acrylate; propoxylated glyceryl(meth)acrylate; pentaerythritol tetra(meth)acrylate; ditrimethylolpropane tetra(meth)acrylate; dipentaerythritol penta(meth)acrylate; ethoxylated pentaerythritol tetra(meth)acrylate; polysiloxane di(meth)acrylate; various types of urethane(meth)acrylates; various types of metal(meth)acrylates; polypropylene glycol di(meth) acrylate; N,N'-phenylene dimaleimide; bismaleimide diphenylmethane; N,N'-phenylene diacrylamide; divinylbenzene; triallyl isocyanurate; and the like. Of these, acrylates that have an electron withdrawing group in a molecule such as a carbonyl group (ketones, aldehydes, esters, carboxylic acids, carboxylates, or amides), a nitro group, a cyano group, and the like are preferable from a perspective of increasing the modification rate.

An added amount of the radical polymeric monomer having at least difunctionality is not particularly limited, but is preferably from 0.001 to 0.5 mol, and more preferably from 0.005 to 0.2 mol, per 100 g of the butyl rubber. If the added amount of the radical polymeric monomer having at least difunctionality is too small, there is a possibility that crosslinking of the modified butyl rubber will not proceed. Conversely, if the added amount is too large, physical properties of the crosslinked product are liable to be inferior.

The radical polymeric monomer having an alkoxysilyl group is preferably as represented by the following formula (11).

$$Si(OR^7)_{4-n}(R^6-A)_n \qquad (11)$$

In the formula (11), $R^6$ and $R^7$ each independently are hydrocarbon groups; A represents a radical polymeric group; and n is an integer from 1 to 3.

Herein, when n is 2 or 3, $R^6$ may each be a different group. Preferable examples of such $R^6$ include alkyl groups such as a methyl group, an ethyl group, a propyl group, a hexyl group, a dodecyl group, an octadecyl group, and the like; cycloalkyl groups such as a cyclopropyl group, a cyclohexyl group, and the like; aryl groups such as a phenyl group, a benzyl group, and the like.

Also, when n is 1 or 2, $R^7$ may each be a different group. Preferable examples of such $R^7$ include alkyl groups such as a methyl group, an ethyl group, a propyl group, a hexyl group, a dodecyl group, an octadecyl group, and the like; cycloalkyl groups such as a cyclopropyl group, a cyclohexyl group, and the like; aryl groups such as a phenyl group, a benzyl group, and the like; polyoxyalkylene groups such as polyethylene glycol, polypropylene glycol, and the like.

Furthermore, when n is 2 or 3, the radical polymeric group A may each be a different group. Preferable examples of such radical polymeric group A include a vinyl group, an allyl group, a styryl group, a (meth)acryloxy group, a (meth)acrylamide group, a halogenated vinyl group, an acrylonitrile group, and the like. Of these groups, those that contain an electron withdrawing group (such as a carbonyl group, halogen, a cyano group, or the like) are more preferable. Of these groups, (meth)acryloxy groups are especially preferable.

Preferable examples of the radical polymeric monomer having an alkoxysilyl group include vinyl methoxysilane, vinyl trimethoxysilane, vinyl ethoxysilane, vinyl triethoxysilane, γ-methacryloxypropyl trimethoxysilane, γ-methacryloxypropyl methyldimethoxysilane, γ-methacryloxypropyl dimethylmethoxysilane, γ-acryloxypropylmethyl diethoxysilane, γ-acryloxypropyl dimethylethoxysilane, γ-acryloxypropyl triethoxysilane, N-(propyltriethoxysilane) maleimide, and the like.

Furthermore, as the co-crosslinking agent (c), a radical polymeric monomer having an alkoxysilyl group may be used in a hydrolyzed and condensed form. For example, a silicone oil-based coupling agent having two or more repeating siloxane bond units and an alkoxysilyl group that is an oligomer having a radical polymeric group, and the like, may also be used.

An added amount of the radical polymeric monomer having an alkoxysilyl group used in the present invention is not particularly limited, but is preferably from 0.0001 to 0.5 mol, and more preferably from 0.0003 to 0.2 mol, per 100 g of the butyl rubber. If the added amount of the radical polymeric monomer having an alkoxysilyl group is too small, the effect of increasing the modulus and the breaking strength of the crosslinked rubber molded body will not be achieved. Conversely, it is not preferable that the added amount of the radical polymeric monomer having an alkoxysilyl group be too high, because there is a possibility that an excess of the radical polymeric monomer having an alkoxysilyl group will have a detrimental effect on a compression set of the crosslinked rubber molded body.

With the present invention, the modified butyl rubber can be prepared as shown below. The modified butyl rubber (2) is prepared by heating a pre-blended mixture of the butyl rubber, the compound (a) and the radical initiator (b) at a temperature from 150 to 220° C. in a nitrogen-substituted sealed kneader until reaction occurs. The modified butyl rubber (1) is prepared by temporarily reducing the temperature, then adding the co-crosslinking agent (c) to the modified butyl rubber (2), repeating nitrogen substitution, and then heating at a temperature preferably from 120 to 220° C. until reaction occurs. By performing successive reactions, a degree of grafting of the co-crosslinking agent (c) to the butyl rubber can be increased. The aforementioned reactions are preferably performed after the nitrogen substitution, but the reactions can also be performed under oxygen-lean conditions.

Furthermore, by adding the co-crosslinking agent (c) to the modified butyl rubber (2), the modified rubber composition (B) containing the unreacted co-crosslinking agent (c) may be prepared.

With the present invention, the adding and reacting of the co-crosslinking agent (c) can be performed by any commonly known method. Various types of additives, reinforcing fillers, and crosslinking agents may also be simultaneously added. The modification reactions and formulation blendings described above can be performed using a sealed kneader, a twin-screw extrusion kneader, a single-screw extrusion kneader, a roller, a Banbury mixer, kneader, and the like.

With the present invention, the modified rubber compositions (A) and (B) can also contain other rubber components in addition to the modified butyl rubbers (1) and (2). Examples of such other rubber components include natural rubber, isoprene rubber, various types of butadiene rubbers, various types of styrene-butadiene rubbers, butyl rubber, halogenated butyl rubber, chloroprene rubber, acryl rubber, silicone rubber, fluorine rubber, epichlorohydrin rubber, a styrene-isoprene-butadiene copolymer, an ethylene-propylene-diene terpolymer, an ethylene-propylene copolymer, an ethylene-propylene-butene terpolymer, a styrene-butadiene-styrene block copolymer, a styrene-isoprene-styrene copolymer, a styrene-ethylene-butene-styrene block copolymer, a styrene-ethylene-propylene-styrene copolymer, an acrylonitrile-butadiene copolymer, a hydrogenated acrylonitrile-butadiene copolymer, polyisobutylene, polybutene, a styrene-p-methylstyrene copolymer, a halogenated styrene-p-methylstyrene copolymer, and the like. An added amount of the modified butyl rubbers (1) and (2) is preferably at least 5 weight %, more preferably at least 10 weight %, and even more preferably from 30 to 100 weight %.

The adhesive rubber composition of the present invention can contain a reinforcing filler. Examples of the reinforcing filler include carbon black, silica, talc, various types of clay, and the like. The compounded amount of the reinforcing filler is preferably from 30 to 80 parts by weight, and more preferably from 40 to 70 parts by weight, per 100 parts by weight of the rubber component of the adhesive rubber composition. By compounding the reinforcing filler in such a range, the adhesive rubber strength of the vulcanization adhesive layer can be increased while ensuring the processability of the adhesive rubber composition.

The adhesive rubber composition can also contain various types of additives that are commonly added for rubber compositions, such as vulcanizing and crosslinking agents, vulcanizing and crosslinking accelerators, various types of oils, anti-aging agents, plasticizers, and the like. These additives can be kneaded in by any commonly known method to form a composition, which can be used for vulcanizing or crosslinking. Blending quantities of these additives may be any conventional quantity, as long as the object of the present invention is not impaired.

The manufacturing method of the laminated body of rubber layers of the present invention includes forming a rubber molding body using the rubber composition formed from the adhesive rubber composition described above, and then forming an unvulcanized laminated body of rubber layers in which the rubber molding body as an unvulcanized adhesive layer is disposed between the rubber layer and the resin layer. When the obtained unvulcanized laminated body of rubber layers is vulcanization molded, the peroxide crosslinking of the unvulcanized adhesive layer and the crosslinking/vulcanization-adhering of the resin layer and the rubber layer proceed simultaneously due to heating, thereby the adhesion between the resin layer and the rubber layer can be enhanced to or beyond conventional levels.

The laminated body of rubber layers of the present invention can suitably constitute a part of a pneumatic tire. The pneumatic tire using the laminated body of rubber layers can securely hold an accessory having a resin layer or an accessory mounted using a resin layer interposed therebetween.

Figure 3:
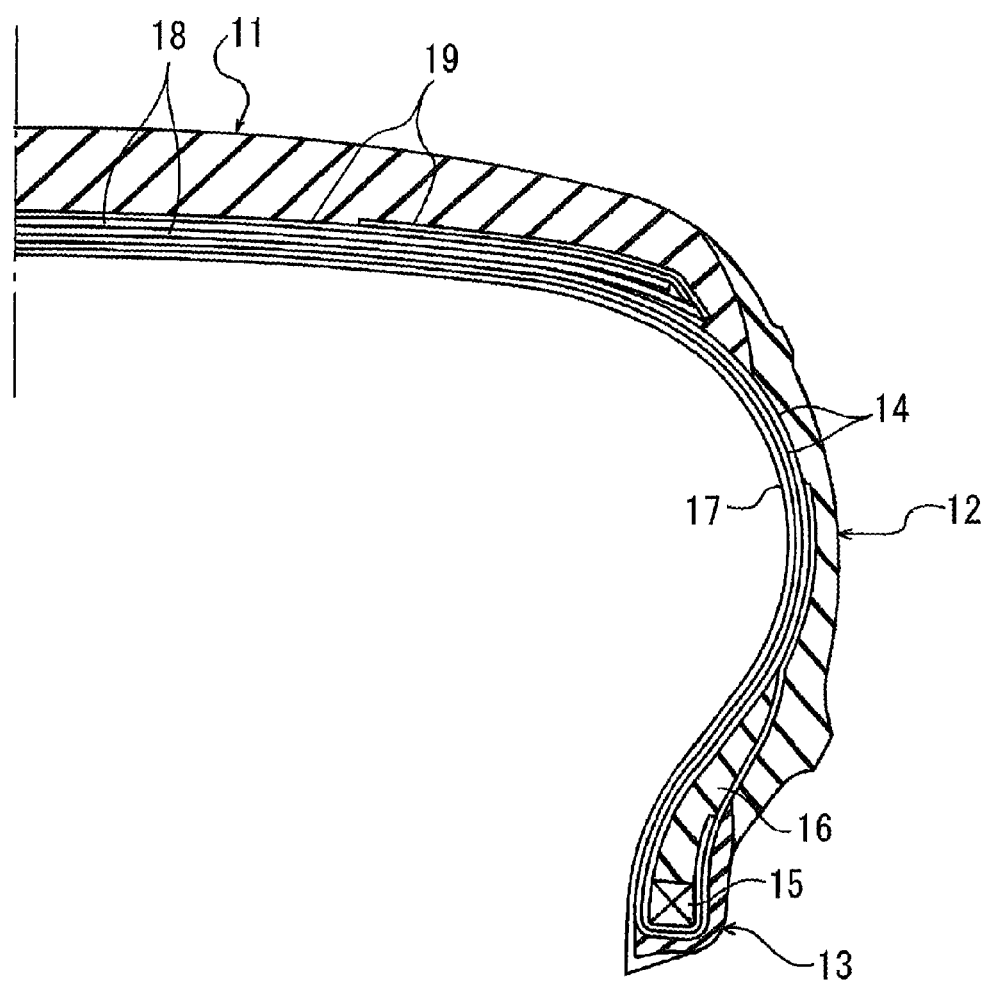
FIG. 3 is a partial cross-sectional view in a tire meridian direction illustrating an embodiment of a pneumatic tire in which the laminated body of rubber layers of the present invention is used.

FIG. 3 illustrates an embodiment of a pneumatic tire in which the laminated body of rubber layers is employed. In FIG. 3, 11 is a tread portion, 12 is a side wall portion, and 13 is a bead portion.

In FIG. 3, two layers of a carcass layer 14, formed by arranging reinforcing cords extending in a tire radial direction in a tire circumferential direction at a predetermined pitch and embedding these reinforcing cords in a rubber layer, is disposed extending between left and right side bead portions 13. Both ends are made to sandwich a bead filler 16 around a bead core 15 that is embedded in the bead portions 13 and are folded back in a tire axial direction from the inside to the outside. An inner liner layer 17 is disposed inward of the carcass layer 14. Two layers of a belt layer 18, formed by arranging reinforcing cords extending inclined to the tire circumferential direction in the tire axial direction at a predetermined pitch and embedding these reinforcing cords in a rubber layer, is disposed on an outer circumferential side of the carcass layer 14 of the tread portion 11. The reinforcing cords of the two layers of a belt layer 18 cross interlaminarly so that the incline directions with respect to the tire circumferential direction are opposite each other. A belt cover layer 19 is disposed on an outer circumferential side of the belt layers 18.

The rubber layer constituting the laminated body of rubber layers of the present invention is preferably an inner liner layer 17.

The present invention is further described below by examples. However, the scope of the present invention is not limited to these examples.

Examples

Nine types of adhesive rubber compositions (Working examples 1 to 6 and Comparative examples 1 to 3) with formulations shown in Table 1 were prepared by kneading for 6 minutes in a 150 cc kneader, and then kneading using an 8 inch open roller. Unvulcanized rubber sheets (unvulcanized adhesive layers) were formed from the obtained adhesive rubber compositions.

Figure 2:
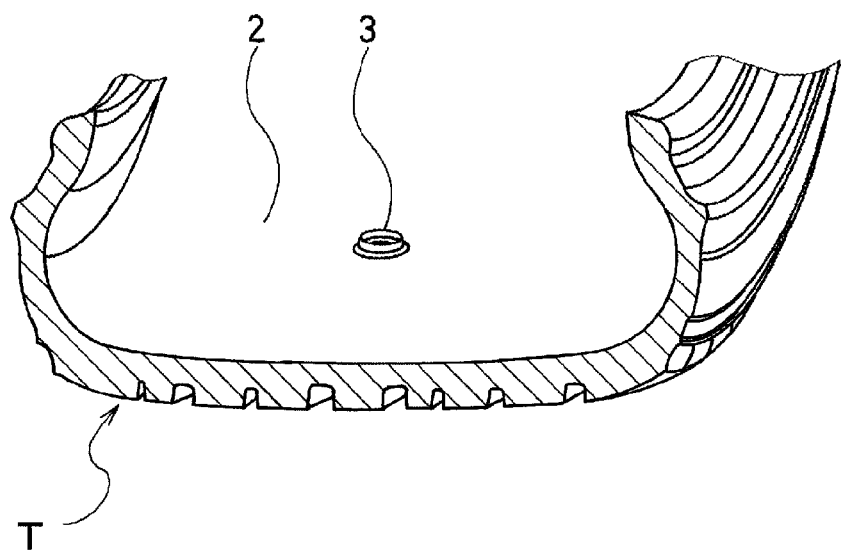
FIG. 2 is a schematic view illustrating another embodiment of the laminated body of rubber layers of the present invention.

As illustrated in FIG. 2, an unvulcanized tire T having a tire size of 215/60R16 was green molded, in a manner such that a snap fastener made from nylon resin (resin layer 3) was arranged on the tire inner surface 2 (unvulcanized rubber layer) by interposing the obtained unvulcanized adhesive layer therebetween. The tire inner surface was formed by an inner liner layer containing the rubber composition shown in Table 2. The rubber composition for an inner liner was made by measuring the formulation components other than sulfur and the vulcanization accelerator, kneading in a sealed Banbury mixer, discharging a master batch at a temperature of 160° C., and cooling to room temperature. Sulfur and the vulcanization accelerator were then added to the master batch in a sealed Banbury mixer and mixed to produce the rubber composition.

The unvulcanized tire T molded in the above described manner was inserted into a mold and vulcanized using a bladder (steam temperature: 180° C.; vulcanization time: 10 minutes), and thus a pneumatic tire having a snap fastener was produced (Working examples 1 to 6 and Comparative examples 1 to 3). The adhesion condition of the snap fasteners after the tire durability test and the peel strength of the snap fasteners of the obtained pneumatic tires were evaluated according to the following methods.

Peel Strength

Tire samples were obtained by cutting the obtained pneumatic tires (Working examples 1 to 6 and Comparative examples 1 to 3) into an adequate size so that the tire samples had vulcanization-adhered snap fasteners and inner liner layers. The peeling strength between the inner liner layer and the snap fastener was measured in accordance with JIS K6256-1. The obtained results are shown in Table 1 as index values with a peel strength of Comparative example 1 being 100. Larger index values indicate larger peeling strength.

Adhesion Condition after Durability Test

On another snap fastener that fit the snap fastener adhered on the pneumatic tire, an air pressure monitoring sensor (manufactured by the Yokohama Rubber Co., Ltd.) was fixed. This air pressure monitoring sensor was installed on the inner surface of the pneumatic tire by fitting the snap fasteners.

Each of the obtained pneumatic tires was assembled on a standard rim, inflated to an air pressure of 210 kPa, and then mounted on an indoor drum testing machine (drum diameter: 1,707 mm) in accordance with JIS D4230. A durability test was performed by running at a speed of 80 km/hr for 80 hours, using a test load of 4.82 kN. After the test, adhesion condition of the snap fastener adhered on the inner surface of the pneumatic tire was visually inspected. The adhesion condition was evaluated on the following 3-step scale evaluation criteria. The evaluation results are shown in Table 1.

○: The adhesion condition of the snap fastener after the durability test was the same as the condition prior to the durability test. No peeling was observed.

: Partial peeling of the snap fastener was observed after the durability test.

×: The snap fastener was peeled off, or partial peeling of the snap fastener was observed while no material failure of the adhesive layer was observed.

TABLE 1

| | | | Comparative Example 1 | Comparative Example 2 | Comparative Example 3 | Working Example 1 | Working Example 2 | Working Example 3 | Working Example 4 | Working Example 5 | Working Example 6 |
|---|---|---|---|---|---|---|---|---|---|---|---|
| Formulation of adhesive rubber composition | IIR | pbw | 100 | | | | | | | | |
| | Modified IIR-1 | pbw | | 100 | | | | | | | |
| | Modified IIR-2 | pbw | | | 100 | | | | | | |
| | Modified IIR-3 | pbw | | | | 100 | | | | | |
| | Modified IIR-4 | pbw | | | | | 100 | 100 | 100 | 100 | |
| | Modified IIR-5 | pbw | | | | | | | | | 100 |
| | Organic peroxide-1 | pbw | | | | | | 5 | | | |
| | Organic peroxide-2 | pbw | | | | | | | 5 | | 5 |
| | Resin crosslinking agent | pbw | | | | | | | | 5 | |
| | Carbon black | pbw | 60 | 60 | 60 | 60 | 60 | 60 | 60 | 60 | 60 |
| | Stearic acid | pbw | 2 | | | | | | | | |
| | Zinc oxide | pbw | 3 | 5 | 5 | 5 | 5 | 5 | 5 | 5 | 5 |
| | Sulfur | pbw | 0.5 | 0.5 | 0.5 | 0.5 | 0.5 | | | | |
| | Vulcanization accelerator | pbw | 1.5 | 1.5 | 1.5 | 1.5 | 1.5 | | | | |
| | Co-crosslinking agent (c) | pbw | | | | | | | | | 6 |

TABLE 1-continued

|  |  |  | Comparative Example 1 | Comparative Example 2 | Comparative Example 3 | Working Example 1 | Working Example 2 | Working Example 3 | Working Example 4 | Working Example 5 | Working Example 6 |
|---|---|---|---|---|---|---|---|---|---|---|---|
| Adhesion evaluation | Peel strength | Index value | 100 | 360 | 180 | 360 | 400 | 480 | 500 | 400 | 400 |
|  | Adhesion condition after durability test |  | x | x |  | ○ | ○ | ○ | ○ | ○ | ○ |

IIR: Butyl rubber, BUTYL 301 (manufactured by Lanxess)
Modified IIR-1: Modified butyl rubber (1) having a number average molecular weight of 115,000 and a Mooney viscosity (ML$_{1+4}$/100° C.) of 58, prepared by the method described below.
Modified IIR-2: Modified butyl rubber (1) having a number average molecular weight of 60,000 and a Mooney viscosity (ML$_{1+4}$/100° C.) of 28, prepared by the method described below.
Modified IIR-3: Modified butyl rubber (1) having a number average molecular weight of 90,000 and a Mooney viscosity (ML$_{1+4}$/100° C.) of 29, prepared by the method described below.
Modified IIR-4: Modified butyl rubber (1) having a number average molecular weight of 90,000 and a Mooney viscosity (ML$_{1+4}$/100° C.) of 45, prepared by the method described below.
Modified IIR-5: Modified butyl rubber (2) having a number average molecular weight of 78,000 and a Mooney viscosity (ML$_{1+4}$/100° C.) of 43, prepared by the method described below.
Organic peroxide-1: Organic peroxide having a temperature at which the half life thereof becomes one minute of 180° C.; dicumylperoxide; and PERCUMYL D-40 (manufactured by NOF Corporation)
Organic peroxide-2: Organic peroxide having a temperature at which the half life thereof becomes one minute of 145° C.; peroxy ketal; Perkadox 12-XL25 (manufactured by Kayaku Akzo Corporation)
Resin crosslinking agent: Brominated alkylphenol resin, TACKIROL (manufactured by Taoka Chemical Co., Ltd.)
Carbon black: SAF grade carbon black (SEAST 9, manufactured by Tokai Carbon Co., Ltd.)
Stearic acid: Beads Stearic Acid YR (manufactured by NOF Corporation)
Zinc oxide: Zinc Oxide #3 (manufactured by Seido Chemical Industry Co., Ltd.)
Sulfur: Powdered sulfur (manufactured by Karuizawa Seisakusho Co., Ltd.)
Vulcanization accelerator: Nocceler DM (manufactured by Ouchi Shinko Chemical Industrial Co., Ltd.)
Co-crosslinking agent (c): Ditrimethylol propane tetraacrylate, SR-355 (manufactured by Sartomer)

Preparation of the Modified Butyl Rubber-1

350.0 g of butyl rubber (BUTYL 301 manufactured by Lanxess), 32.2 g of OH-TEMPO (4-hydroxy-2,2,6,6-tetramethylpiperidinyl-1-oxyl, LA7RD manufactured by ADEKA Corporation, compound (a)), and 24.2 g of 1,3-bis-(t-butyl peroxyisopropyl) benzene (Perkadox 14-G manufactured by Kayaku Akzo Corporation, radical initiator (b)) were weighed into a sealed Banbury mixer set to a temperature of 60° C. and blended for 10 minutes. The obtained mixture was kneaded in a sealed Banbury mixer set to a temperature of 100° C. while performing nitrogen substitution for 5 minutes. While kneading, the temperature was increased to 165° C. and kneading was continued for 20 minutes. A portion of the obtained polymer was dissolved in toluene, and the polymer was isolated and purified by reprecipitation. A TEMPO position of introduction (of the alkoxyamino group) was confirmed by analyzing with $^1$H-NMR using the purified product. A degree of introduction thereof was 0.360 mol %.

The reaction system was temporarily brought to 150° C., and then 11.2 g of ditrimethylol propane tetraacrylate (SR-355 manufactured by Sartomer, co-crosslinking agent (c)) and 5.8 g of methacrylsilane (γ-methacryloxypropyl trimethoxysilane, KBM503 manufactured by Shin-Etsu Chemical Co., Ltd., co-crosslinking agent (c)) were weighed and added. Then, nitrogen substitution was performed for 5 minutes while kneading. While kneading, the temperature was increased to 185° C. and kneading was continued for 15 minutes to obtain the modified butyl rubber-1.

A portion of the obtained modified butyl rubber-1 was dissolved in toluene, and the polymer was isolated and purified by reprecipitation. IR analysis and $^1$H-NMR analysis were performed using the purified product. Ester carbonyl absorption was observed around 1,720 cm$^{-1}$, and a ditrimethylol propane signal was observed near 6.39, 6.10, 5.96, 4.12, and 3.30 ppm according to the $^1$H-NMR. It was confirmed that the ditrimethylol propane tetraacrylate was introduced with a structure that left three olefins remaining A degree of introduction thereof was 0.084 mol %. Furthermore, a methacrylsilane signal was observed near 3.55 ppm, and a degree of introduction thereof was 0.015 mol %.

The number average molecular weight and the Mooney viscosity (ML$_{1+4}$/100° C.) of the obtained modified butyl rubber-1 were measured according to the methods described below. The number average molecular weight of the modified butyl rubber-1 was 115,000, and the Mooney viscosity (ML$_{1+4}$/100° C.) of the modified butyl rubber-1 was 58.

Number Average Molecular Weight

The number average molecular weight of the modified butyl rubber was measured via gel permeation chromatography (GPC), in terms of standard polystyrene.

Mooney Viscosity (ML$_{1+4}$/100° C.)

The Mooney viscosity (ML$_{1+4}$/100° C.) of the modified butyl rubber was measured in accordance with JIS K6300 using an L-type rotor (diameter: 38.1 mm and thickness: 5.5 mm) in a Mooney viscometer under the conditions of a preheating time of 1 minute, a rotor rotation time of 4 minutes, 100° C., and 2 rpm.

Preparation of the Modified Butyl Rubber-2

Other than using 350.0 g of a butyl rubber (BUTYL 065 manufactured by JSR Corporation) in place of 350.0 g of the butyl rubber (BUTYL 301 manufactured by Lanxess) used in the preparation of the modified butyl rubber-1 described above, a modified butyl rubber-2 was prepared via the same procedure as that of modified butyl rubber-1.

A portion of the obtained modified butyl rubber-2 was dissolved in toluene, and the polymer was isolated and purified by reprecipitation. A TEMPO position of introduction (of the alkoxyamino group) was confirmed by analyzing with $^1$H-NMR using the purified product. A degree of introduction thereof was 0.410 mol %.

The number average molecular weight and the Mooney viscosity (ML$_{1+4}$/100° C.) of the obtained modified butyl rubber-2 were measured according to the methods described above. The number average molecular weight of the modified butyl rubber-2 was 60,000, and the Mooney viscosity ($ML_{1+4}/100°$ C.) of the modified butyl rubber-2 was 28.

Preparation of the Modified Butyl Rubber-3

Other than using 175.0 g of a butyl rubber (BUTYL 402 manufactured by Lanxess) in place of the half of 350.0 g, that is 175.0 g, of the butyl rubber (BUTYL 301 manufactured by Lanxess) used in the preparation of the modified butyl rubber-1 described above, a modified butyl rubber-3 was prepared via the same procedure as that of modified butyl rubber-1.

A portion of the obtained modified butyl rubber-3 was dissolved in toluene, and the polymer was isolated and purified by reprecipitation. A TEMPO position of introduction (of the alkoxyamino group) was confirmed by analyzing with $^1$H-NMR using the purified product. A degree of introduction thereof was 0.485 mol %.

The number average molecular weight and the Mooney viscosity ($ML_{1+4}/100°$ C.) of the obtained modified butyl rubber-3 were measured according to the methods described above. The number average molecular weight of the modified butyl rubber-3 was 90,000, and the Mooney viscosity ($ML_{1+4}/100°$ C.) of the modified butyl rubber-3 was 29.

Preparation of the Modified Butyl Rubber-4

Other than using 175.0 g of a butyl rubber (BUTYL 402 manufactured by Lanxess) in place of the half of 350.0 g, that is 175.0 g, of the butyl rubber (BUTYL 301 manufactured by Lanxess) and using a SAF grade carbon in place of the carbon used in the preparation of the modified butyl rubber-1 described above, a modified butyl rubber-4 was prepared via the same procedure as that of modified butyl rubber-1.

A portion of the obtained modified butyl rubber-4 was dissolved in toluene, and the polymer was isolated and purified by reprecipitation. A TEMPO position of introduction (of the alkoxyamino group) was confirmed by analyzing with $^1$H-NMR using the purified product. A degree of introduction thereof was 0.482 mol %.

The number average molecular weight and the Mooney viscosity ($ML_{1+4}/100°$ C.) of the obtained modified butyl rubber-4 were measured according to the methods described above. The number average molecular weight of the modified butyl rubber-4 was 90,000, and the Mooney viscosity ($ML_{1+4}/100°$ C.) of the modified butyl rubber-4 was 45.

Preparation of the Modified Butyl Rubber-5

350.0 g of butyl rubber (BUTYL 402 manufactured by Lanxess), 32.2 g of OH-TEMPO (4-hydroxy-2,2,6,6-tetramethylpiperidinyl-1-oxyl, LAIRD manufactured by ADEKA Corporation, compound (a)), and 30.4 g of di-t-butylperoxide (Perbutyl D manufactured by NOF Corporation, radical initiator (b)) were weighed into a sealed Banbury mixer set to a temperature of 60° C. and blended for 10 minutes. The obtained mixture was kneaded in a sealed Banbury mixer set to a temperature of 100° C. while performing nitrogen substitution for 5 minutes. While kneading, the temperature was increased to 186° C. and kneading was continued for 20 minutes to obtain the modified butyl rubber-5.

A portion of the obtained modified butyl rubber-5 was dissolved in toluene, and the polymer was isolated and purified by reprecipitation. A TEMPO position of introduction (of the alkoxyamino group) was confirmed by analyzing with $^1$H-NMR using the purified product. A degree of introduction thereof was 0.480 mol %.

The number average molecular weight and the Mooney viscosity ($ML_{1+4}/100°$ C.) of the obtained modified butyl rubber-5 were measured according to the methods described above. The number average molecular weight of the modified butyl rubber-5 was 78,000, and the Mooney viscosity ($ML_{1+4}/100°$ C.) of the modified butyl rubber-5 was 43.

TABLE 2

| IIR | pbw | 100 |
| Carbon black | pbw | 60 |
| Stearic acid | pbw | 2 |
| Oil | pbw | 8 |
| Zinc oxide | pbw | 3 |
| Magnesium oxide | pbw | 0.5 |
| Petroleum resin | pbw | 3 |
| Sulfur | pbw | 0.5 |
| Vulcanization accelerator | pbw | 1.5 |

The types of raw materials used in Table 2 are shown below.

IIR: Butyl rubber, BUTYL 301 (manufactured by Lanxess)
Carbon Black: GPF grade carbon black manufactured by Tokai Carbon Co., Ltd.
Stearic acid: Beads Stearic Acid YR (manufactured by NOF Corporation)
Oil: Aroma oil FR-120 (manufactured by Air Water Inc.)
Zinc oxide: Zinc Oxide #3 (manufactured by Seido Chemical Industry Co., Ltd.)
Magnesium oxide: Kyowa mag 150 (manufactured by Kyowa Chemical Industry Co., Ltd.)
Petroleum resin: Hilets G100X (manufactured by Mitsui Chemicals, Inc.)
Sulfur: Powdered sulfur (manufactured by Karuizawa Seisakusho Co., Ltd.)
Vulcanization accelerator: MBTS, Nocceler DM (manufactured by Ouchi Shinko Chemical Industrial Co., Ltd.)

As is clear from the results shown in Table 1, it was confirmed that the laminated bodies of rubber layers of the Working examples 1 to 6 had the peeling strength with respect to the tire inner surface of the snap fasteners enhanced to or beyond conventional levels, as well as excellent adhesion conditions after the tire durability test.

In Comparative example 2, although the initial peeling strength was improved, since the number average molecular weight of the modified butyl rubber-1 exceeded 110,000, the snap fastener was peeled off after the tire durability test. Furthermore, since the number average molecular weight of the modified butyl rubber-1 in Comparative example 3 was less than 70,000, the initial peeling strength was lower than that of Working examples 1 to 6, and the snap fastener on the tire side was partially peeled off after the tire durability test.

REFERENCE NUMERALS

1 Adhesive layer
2 Rubber layer
3 Resin layer
17 Inner liner layer
T Pneumatic tire

What is claimed is:
1. A pneumatic tire comprising a laminated body of rubber layers including:

a resin layer formed from a polyester resin or a polyamide resin;

a rubber layer formed from a rubber composition containing a diene rubber; and an adhesive layer formed from an adhesive rubber composition and being disposed between the resin layer and the rubber layer;

the adhesive rubber composition containing a modified rubber composition (A) having a number average molecular weight of 70,000 to 110,000;

the modified rubber composition (A) being formed from a modified butyl rubber (1) formed by reacting, with a butyl rubber, a compound (a) having in a molecule a nitroxide free radical that is stable at ambient temperature in the presence of oxygen, a radical initiator (b), and a co-crosslinking agent (c); and wherein the adhesive rubber composition further comprises a resin crosslinking agent selected from the group consisting of alkylphenol-formaldehyde resin, melamine-formaldehyde condensation product, and triazine-formaldehyde condensation product.

2. The pneumatic tire according to claim 1, wherein the modified rubber composition (A) has a Mooney viscosity ($ML_{1+4}$/100° C.) in accordance with JIS K6300 of 30 to 55.

3. A pneumatic tire comprising a laminated body of rubber layers comprising:

a resin layer formed from a polyester resin or a polyamide resin;

a rubber layer formed from a rubber composition containing a diene rubber; and an adhesive layer formed from an adhesive rubber composition and being disposed between the resin layer and the rubber layer;

the adhesive rubber composition containing a modified rubber composition (A) or a modified rubber composition (B) both having a number average molecular weight of 70,000 to 110,000 and a compounded amount of resin crosslinking agent and peroxide;

the modified rubber composition (A) being formed from a modified butyl rubber (1) formed by reacting, with a butyl rubber, a compound (a) having in a molecule a nitroxide free radical that is stable at ambient temperature in the presence of oxygen, a radical initiator (b), and a co-crosslinking agent (c); and the modified rubber composition (B) being formed by compounding the co-crosslinking agent (c) with a modified butyl rubber (2) formed by reacting the compound (a) and the radical initiator (b) with the butyl rubber; and and the compounded resin crosslinking agent includes a resin crosslinker which is at least one of alkylphenol-formaldehyde resin, melamine-formaldehyde condensation product, and triazine-formaldehyde condensation product.

4. The pneumatic tire according to claim 3, wherein the modified rubber composition (A) and the modified rubber composition (B) have a Mooney viscosity ($ML_{1+4}$/100° C.) in accordance with JIS K6300 of 30 to 55.

* * * * *